United States Patent Office 3,574,116
Patented Apr. 6, 1971

3,574,116
MANGANESE-ZINC FERRITE WITH COBALT ADDITIVE FOR PRODUCING A DESIRED TEMPERATURE COEFFICIENT OF INITIAL PERMEABILITY
Izuru Sugano, Taneaki Okuda, Tsuneo Akashi, Yoshihiro Kenmoku, and Toshiro Tsuji, Tokyo, Japan, assignors to Nippon Electric Company, Limited, Tokyo, Japan
Filed July 23, 1968, Ser. No. 746,837
Claims priority, application Japan, July 25, 1967, 42/48,318
Int. Cl. C04b $35/38, 35/34$
U.S. Cl. 252—62.59                               1 Claim

ABSTRACT OF THE DISCLOSURE

Oxide magnetic materials of the manganese-zinc ferrite type are given improved temperature coefficients of initial permeability by the addition or substitution of a cobalt compound so that the resultant material contains 0.01 to 1.0 mol percent $Co_2O_3$. Calcium and silicon compounds to give ultimate mol percents of 0.1 to 0.6 mol percent CaO and 0.01 to 0.07 mol percent $SiO_2$ respectively may be added to improve the loss characteristics without deleterious effects upon the aforesaid temperature coefficients.

BACKGROUND OF THE INVENTION

This invention relates to oxide magnetic materials, manganese-zinc ferrites, improved in both loss characteristics and the temperature coefficient of the initial permeability.

Manganese-zinc ferrites have found extensive application in magnetic materials for communication equipment and are available in fairly high grades. Nevertheless, much is still desired of these materals. U.S. Pat. 3,106,534 to the same assignee is based on the discovery that manganese-zinc ferrites which contain 0.05 to 0.3 wt. percent (equivalent to 0.1 to 0.6 mol percent) of calcium oxide and 0.005 to 0.035 wt. percent (0.01 to 0.7 mol percent) of silicon oxide as additive ingredients possess remarkably improved loss characteristics. However, the recent tendency of using communication apparatus over wide temperature ranges has called for magnetic materials which not only exhibit superior loss characteristics but, at the same time, display certain temperature coefficients of the initial permeability over a wide temperature range. It is of great importance to satisfy this requirement today and the techniques of the prior art are unable to meet this requirement adequately.

The temperature coefficient of the initial permeability will now be considered. Although the required value of the temperature coefficient of magnetic material for communication apparatus varies with the particular application, it is the severest requirement for a magnetic material to form the coil of filter in combination with a capacitor, where the temperature coefficient of the initial permeability is required to compensate the capacity temperature coefficient of the capacitor. The temperature coefficient must be positive or negative within a required temperature range. Occasionally, it must be kept substantially constant, and at a relatively low value.

It is well known that the changes in the temperature coefficient of the initial permeability of a manganese-zinc ferrite depend upon the composition ratio of manganese, zinc and iron constituting the material.

Figure 1:
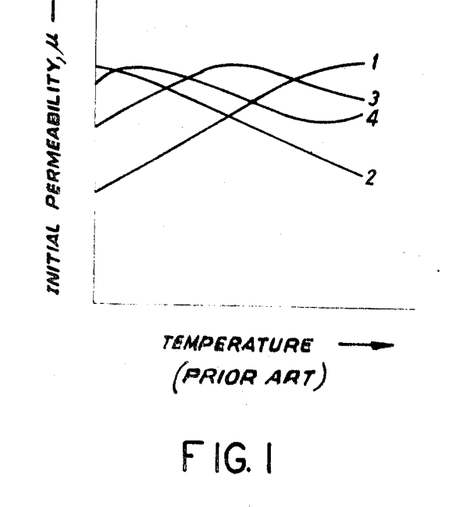
FIG. 1 shows initial permeability vs. temperature characteristic curves of conventional manganese-zinc ferrites.

In FIG. 1, there are shown four curves illustrating various initial permeability vs. temperature characteristics.

As will be seen from FIG. 1, the patterns of initial permeability changes with temperature as viewed in the vicinity of room temperature are generally represented by the following four typical types:

(1) The monotonously increasing type always exhibiting a positive temperature coefficient within a required temperature range;

(2) The monotonously decreasing type always exhibiting a negative temperature coefficient within a required temperature range;

(3) The type having a maximum or minimum value (with the temperature coefficient changing from positive to negative or vice versa within the required temperature range); and (4) The type having both maximum and minimum values (with the temperature coefficient changing from positive to negative and then to positive within the required temperature range).

It is possible to displace the initial permeability curve towards the higher or lower temperature sides while maintaining its pattern by varying the composition ratio of basic metals such as manganese, zinc, and iron, or by adding a metal such as titanium, tin or tantalum which has trivalent or more positive valency or a metal such as lithium or copper which has bivalent or less positive valency in such a manner that the added metal will finally be converted into an oxide. Such a result may also be achieved by varying the atmosphere or temperature for sintering.

According to such conventional processes, however, it is necessary to use a part fairly deviated to the low temperature side from the maximum point or to use a part fairly deviated to the high temperature side from the minimum point in order to obtain a substantially constant and positive temperature coefficient. Conversely, when a negative temperature coefficient is to be obtained, it is necessary to utilize a temperature range between the maximum and minimum points and considerably distant from both of these points. In either case, the absolute value of temperature coefficient thus obtained will be undesirably large.

If it is desired to lower the absolute value of temperature coefficient, positive or negative, only the temperature ranges around the maximum and minimum points are utilizable. This inevitably leads to variation of the temperature coefficient with temperature and the temperature region to be used is relatively limited.

Thus, it is impossible to employ prior techniques which consist in varying the composition or in choosing sintering conditions in order to attain a substantially constant, relatively small temperature coefficient over an extensive temperature range.

OBJECT

Accordingly, it is the object of this invention to provide manganese-zinc ferrites with excellent loss characteristics and, at the same time, desired positive or negative, small initial-permeability temperature coefficients over a wide temperature range.

BRIEF SUMMARY OF THE INVENTION

We have found that the addition of a small amount of cobalt compound is highly effective in improving the initial permeability vs. temperature characteristics and obtaining an initial-permeability temperature coefficient best suited for a particular use extending over a wide temperature range. While it has been known that the addition of a cobalt compound reduces the loss in magnetic fields with intensities as high as several hunderd oersteds, it is also well known that this effect of the additive is not observed in the least in manganese-zinc ferrites suitable for communication apparatus for use at low magnetic fields with intensities of several milli-oersteds or less. Nothing at all has hitherto been known about the influence of cobalt compounds upon the initial permeability vs. temperature characteristics of manganese-zinc ferrites.

We have also found that oxide magnetic materials having the desired initial-permeability temperature coefficients over extensive temperature ranges as well as excellent loss characteristics can be obtained by allowing manganese-zinc ferrites to contain both a cobalt compound effective in improving the initial permeability vs. temperature characteristics of the ferrites and calcium oxide and silicon oxide which jointly contribute to an improvement of the loss characteristics.

The simultaneous improvement of initial-permeability temperature coefficient and loss characteristics by the coexistence of the three additives are presumably attributable to the fact that the positive magnetic anisotropy caused by $Co^{2+}$ in the three additives counteracts the negative magnetic anisotropy by mother matrix, with the result that a magnetic anisotropy having a low absolute value and small temperature changes is produced which does not interfere with the already described effect of calcium oxide and silicon oxide for improving the loss characteristics, but provides a manganese-zinc ferrite which concurrently possesses both of the advantageous effects.

As stated above, it is known that the addition of a cobalt compound serves to reduce the total loss in high magnetic fields of manganese-zinc ferrites, but there is no literature whatsoever on the effect of the cobalt compound upon the temperature characteristics of the initial permeability. Accordingly, several examples (Examples 1 through 9) will be given to illustrate the new finding that the addition of a cobalt compound in an amount between 0.01 to 1 mol percent in terms of $Co_2O_3$ is extremely beneficial in improving the initial permeability vs. temperature characteristics of manganese-zinc ferrites. The optimum amount of cobalt and the effective limits of addition to meet various basic compositions and atmospheres are also clarified. Following these examples and in conjunction with Examples 10 and 11, the finding that the effect achieved by the addition of a cobalt compound is maintained even where there is also present an additive which is known to change the initial permeability vs. temperature characteristics of the ferrite shall be described. An example (Example 12) will be given to demonstrate the finding that the known effect of the improvement of loss characteristics by the simultaneous addition of calcium oxide and silicon oxide is not impaired by the addition of a cobalt compound in combination therewith and, in addition, the favorable influence of the cobalt compound upon the initial permeability vs. temperature characteristics is not marred by the coexistence of calcium oxide and silicon oxide. It will also be revealed that the simultaneous addition of all the three additives, i.e., calcium oxide, silicon oxide and cobalt compound, can produce a manganese-zinc ferrite having not merely excellent loss characteristic but, an excellent temperature coefficient of the initial permeability over a wide temperature range.

The above-mentioned and other features and objects of this invention and the manner of attaining them will become more apparent and the invention itself will best be understood by reference to the following description of an embodiment of the invention taken in conjunction with the accompanying drawings, the description of which follows.

DETAILED DESCRIPTION OF THE INVENTION

The present invention will now be described with reference to the following examples. The test specimens used in these examples were formed by the usual method of manufacturing ceramics. To be more specific, iron oxide, manganese carbonate and zinc oxides were weighed and mixed to a predetermined composition ratio. With respect to the additives, predetermined amounts of the respective metal oxides were weighed and then ground and mixed altogether in a ball mill for 60 hours. The mixture was prefired in air at 800° C. for 4 hours and then formed and fired again.

Unless otherwise specified, the firing was conducted in a nitrogen atmosphere containing 0.4% oxygen at 1180° C. for 8 hours. The resulting sintered material was allowed to cool in the furnace. The dependence of the initial permeability on the temperature of the test specimens were measured within the temperature range of $-30°$ C. to $+90°$ C.

Examples 1 to 5 illustrate the effects attained by the addition of cobalt in five different cases, i.e., where the initial permeability vs. temperature curve without the addition of cobalt monotonously increases, monotonously decreases, has a maximum point, has a minimum point and has both maximum and minimum points.

EXAMPLE 1

Figure 2:
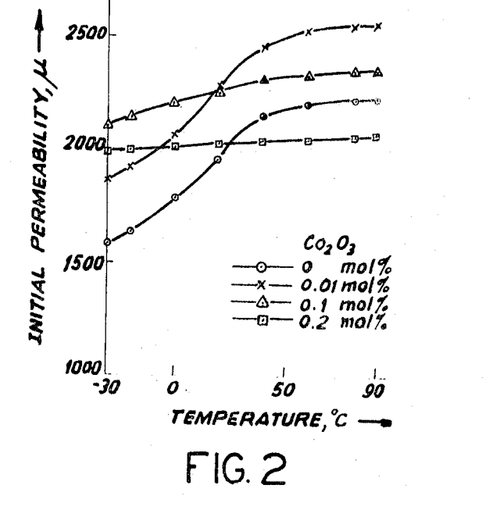
FIGS. 2 through 20 show characteristic curves of manganese-zinc ferrites including various additive percentages according to the present invention.

The initial permeability temperature changes caused by the addition of $Co_2O_3$ to a Mn-Zn ferrite having a fundamental composition of 54 mol percent $Fe_2O_3$, 34 mol percent MnO, and 12 mol percent ZnO, (the composition being kept constant) are shown in FIG. 2.

Without the addition of $Co_2O_3$, the initial permeability increases continuously but the initial-permeability temperature coefficients vary widely with different temperatures. The initial-permeability temperature coefficients $(\Delta\mu/\mu^2_{20}/\Delta C)$ within the temperature range of $-30°$ C. to $+20°$ C. average as high as $+2.02 \times 10^{-6}$. About 60° C., however, the initial-permeability temperature coefficient is low at $0.17 \times 10^{-6}$. Between $+20°$ C. and $+60°$ C., the initial-permeability temperature coefficient varies in succession from $+3.01 \times 10^{-6}$ to $+0.30 \times 10^{-6}$ [the initial-permeability temperature coefficent for $-30°$ C. $\sim +90°$ C. is $(+1.59 \pm 1.42) \times 10^{-6}$]. The dependence of the initial permeability on the temperature markedly changed by the addition of $Co_2O_3$. With the addition of 0.2 mol percent of $Co_2O_3$, an initial-peremability temperature coefficient of $(0.15 \pm 0.03) \times 10^{-6}$ is obtained. FIG. 2 clearly shows that the addition of $Co_2O_3$ gives a Mn-Zn ferrite which exhibits a substantially constant, small, positive initial-permeability temperature coefficient over a very wide temperature range.

EXAMPLE 2

Figure 3:
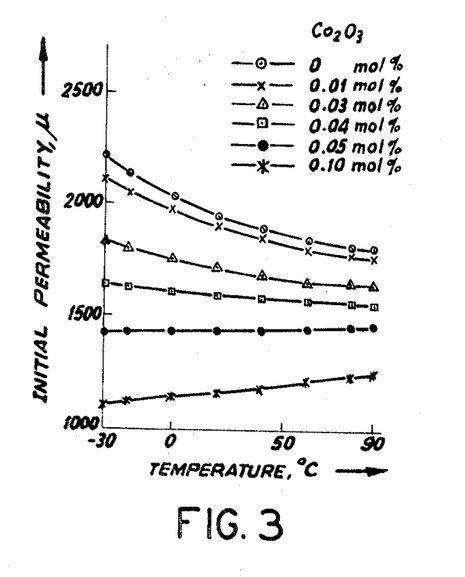

$Co_2O_3$ is added to a Mn-Zn ferrite having a fundamental composition of 56 mol percent $Fe_2O_3$, 34 mol percent MnO, and 10.0 mol percent ZnO, with the ratio of the $Fe_2O_3$, MnO, and ZnO left unaltered. The temperature dependency of the initial-permeability of the resulting magnetic materials is shown in FIG. 3.

Without the addition of $Co_2O_3$, the ferrite displays a continuous decline in the initial-permeability although the initial-permeability temperature coefficients at different temperatures vary, changing in succession from $-1.98 \times 10^{-6}$ on the low temperature side to $-0.32 \times 10^{-6}$ on the high temperature side [initial-permeability temperature coefficient $(-1.15 \pm 0.83) \times 10^{-6}$]. This behavior is gradually modified by the addition of an increasing amount of $Co_2O_3$. The initial-permeability temperature coefficient with 0.04 mol percent $Co_2O_3$ is $(-0.25 \pm 0.05) \times 10^{-6}$, and with 0.05 mol percent $Co_2O_3$ $(+0.14 \pm 0.03) \times 10^{-6}$. It can be clearly seen from FIG. 3 that the addition of $Co_2O_3$ provides a Mn-Zn ferrite having a substantially constant, small, negative or positive initial-permeability temperature coefficient over a very wide temperature range.

EXAMPLE 3

Figure 4:
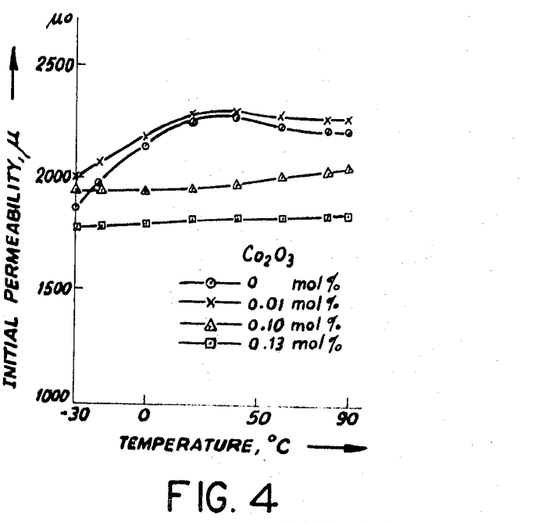

To a Mn-Zn ferrite having a fundamental composition of 54.6 mol percent $Fe_2O_3$, 34 mol percent MnO, and 11.4 mol percent ZnO is added $Co_2O_3$ without modifying the ratio of $Fe_2O_3$, MnO and ZnO. The resulting changes in initial permeability vs. temperature are shown in FIG. 4.

In the absence of $Co_2O_3$, the initial permeability has a peak, and at nearby temperatures the sign of the temperature coefficient of the initial permeability is changed from positive to negative, and the value also undergoes a sharp change from $+2.05 \times 10^{-6}$ through zero to $-0.16 \times 10^{-6}$ [initial-permeability temperature coefficient $$(+0.95 \pm 1.10) \times 10^{-6}]$$

The dependence of the initial permeability on the temperature is changed by the introduction of $Co_2O_3$. For example, with 0.13 mol percent, the temperature coefficient is $(+0.17 \pm 0.04) \times 10^{-6}$. Thus, FIG. 4 clearly indicates that a Mn-Zn ferrite capable of displaying a substantially constant, small, positive temperature coefficient throughout a very wide temperature range can be obtained by the addition of $Co_2O_3$.

EXAMPLE 4

Figure 5:
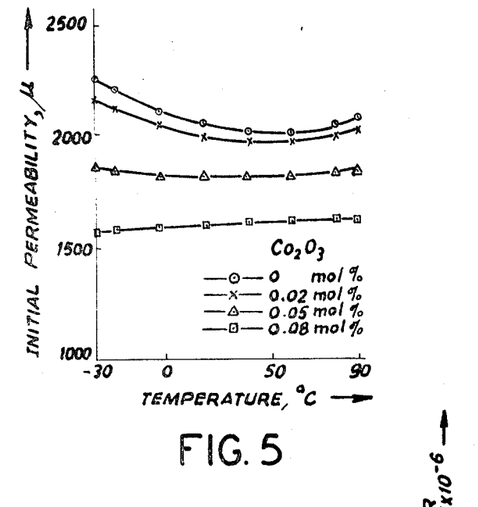

Initial permeability changes with temperature of a Mn-Zn ferrite having a fundamental composition of 55.3 mol percent $Fe_2O_3$, 34.0 mol percent MnO, and 10.7 mol percent ZnO with the addition of $Co_2O_3$ without modification of the ratio of $Fe_2O_3$, MnO, and ZnO are shown in FIG. 5.

Without the addition of $Co_2O_3$ the initial permeability has a minimum value in the neighborhood of 60° C., and the maximum negative gradient of the initial-permeability temperature coefficient is $-1.2 \times 10^{-6}$. With the rise of the temperature, the absolute value is gradually decreased, and the gradient turns positive at a point in the vicinity of 60° C. and a value of about $+0.7 \times 10^{-6}$ is shown at a point about 80° C. The introduction of $Co_2O_3$ renders the initial permeability vs. temperature curve gradually linear. For example, with 0.08 mol percent $Co_2O_3$, an almost constant, positive, small initial-permeability temperature coefficient $(+0.15 \pm 0.03) \times 10^{-6}$ is obtained over a wide temperature range of $-30°$ to $+90°$ C.

EXAMPLE 5

Figure 6:
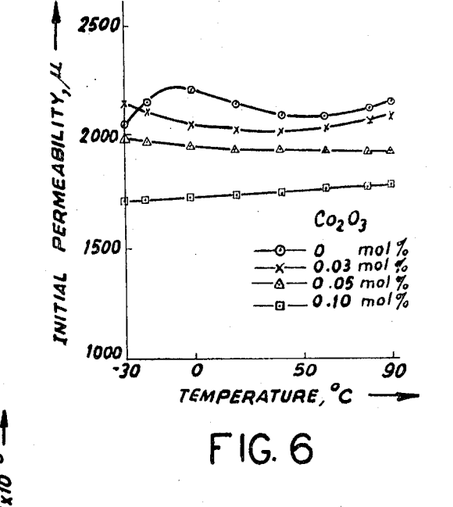

The initial-permeability vs. temperature curve of a Mn-Zn ferrite having a fundamental composition of 54.9 mol percent $Fe_2O_3$, 34 mol percent MnO and 11.1 mol percent ZnO with the introduction of $Co_2O_3$ without the modification of the ratio of the fundamental components are illustrated in FIG. 6.

Without $Co_2O_3$ the initial permeability of the ferrite has a maximum point in the vicinity of $-5°$ C. and a minimum point in the vicinity of $+55°$ C. In the range of $-30°$ C. to $+90°$ C. the temperature coefficient undergoes changes its signs from positive to negative and thence to positive, and shows the maximum positive gradient of $2.12 \times 10^{-6}$ and the maximum negative gradient of $-0.66 \times 10^{-6}$. Maximum deviation of initial permeability is about 8 percent. Introduction of 0.05 mol percent $Co_2O_3$ into the Mn-Zn ferrite brings forth an initial-permeability temperature coefficient which is negative and substantially constant with a value of $(-0.18 \pm 0.18) \times 10^{-6}$. Further, with the addition of 0.88 mol percent $Co_2O_3$, the gradient is kept substantially constant within the range of $-30°$ C. to 90° C., showing a small positive value $(+0.16 \pm 0.03) \times 10^{-6}$. These are illustrated in FIG. 6.

Examples 1 to 5 demonstrate that whatever the initial permeability vs. temperature characteristic curve of a Mn-Zn ferrite without the addition of $Co_2O_3$ the introduction of $Co_2O_3$ is extremely effective in improving the initial permeability vs. temperature characteristics of the material. These examples also testify to the fact that the effective amount of $Co_2O_3$ considerably varies with the composition of $Fe_2O_3$, MnO, and ZnO of ferrite.

Now, by reference to Examples 6 and 7, the fact that the initial-permeability temperature coefficient is improved by $Co_2O_3$ notwithstanding any major change in the composition of Mn-Zn ferrite will be explained and the relationship between the ferrite composition and the amount of $Co_2O_3$ required for the improvement of the temperature coefficient will be clarified.

EXAMPLE 6

A series of Mn-Zn ferrite having fixed composition of 34 mol percent MnO and a varying molar percentage of $Fe_2O_3$ and hence a varying molar percentage of the balance ZnO were prepared to study the effect of $Co_2O_3$ addition. One specimen having a composition consisting of the above amount of MnO and 52.2 mol percent $Fe_2O_3$ and 13.8 mol percent ZnO was used in compiling the graph shown in FIG. 7.

Figure 7:
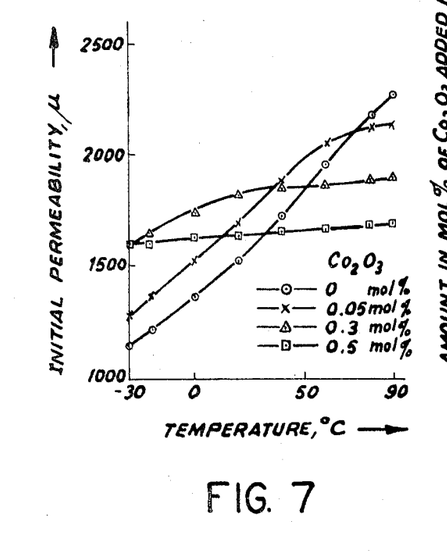

It is clear from FIG. 7 that the addition of a suitable amount of $Co_2O_3$ can improve the initial-permeability temperature coefficient just as in Examples 1 to 5. From FIG. 7 as well as from FIGS. 1 to 5, it is apparent that even if the MnO content is fixed at 34 mol percent and the $Fe_2O_3$ content varies from 52 to 56 mol percent and the ZnO content varies from 14 mol percent to 10 mol percent, the initial-permeability temperature coefficient can be improved by the addition of a suitable amount of $Co_2O_3$. In such case, the amount of $Co_2O_3$ required to attain a desired initial permeability temperature coefficient depends upon the percentage of $Fe_2O_3$ and hence of ZnO. This relationship is illustrated in FIG. 8.

Figure 8:
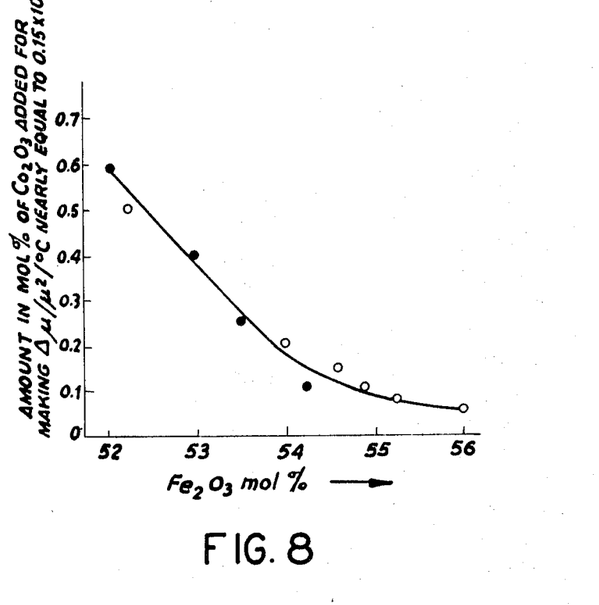

FIG. 8 is a graphic representation of not only the examples shown in FIGS. 1 to 7 but also of other examples in which the MnO content is 34 mol percent and the $Fe_2O_3$ and ZnO contents are varied. The former values are indicated by circles while the latter values are indicated by solid circles. In the graph, the amount of $Co_2O_3$ to be added in order to attain an initial-permeability temperature coefficient of approximately $$+0.15 \times 10^{-6}$$

within a temperature range of $-30°$ C. to $+90°$ C. is charted in relation to the amount of $Fe_2O_3$.

As can be seen from FIG. 8, the amount of $Co_2O_3$ required to attain the desired initial-permeability temperature coefficient is largest with a composition having the least $Fe_2O_3$ content (or the largest ZnO content), and the amount of $Co_2O_3$ required decreases with an increase in the percentage of $Fe_2O_3$.

EXAMPLE 7

Figure 9:
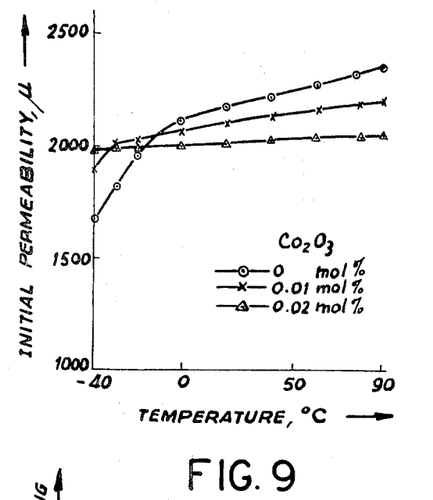
Figure 10:
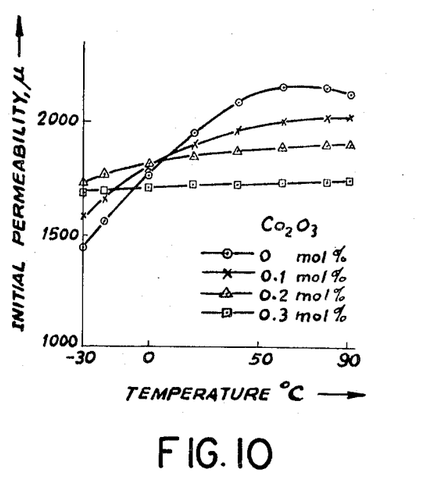

Next, a series of Mn-Zn ferrite having fixed composition of 54 mol percent $Fe_2O_3$ and a varying molar percentage of MnO and hence a varying molar percentage of the balance ZnO were prepared to study the effect of $Co_2O_3$ addition. Two cases, one specimen containing 30 mol percent MnO and 16 mol percent ZnO and the other 36 mol percent MnO and 10 mol percent ZnO are shown in FIGS. 9 and 10 respectively.

Referring to FIGS. 9 and 10, it is again obvious that the addition of a suitable amount of $Co_2O_3$ can ameliorate, in the same way as in the preceding examples the initial-permeability temperature coefficient of ferrites in which the MnO content is kept unchanged and the $Fe_2O_3$ and ZnO contents are varied.

Also, the amount of $Co_2O_3$ to be added in order to attain a desired initial-permeability temperature coefficient is changed by the percentage of MnO and hence of ZnO. This tendency is typically illustrated in FIG. 11. This figure contains the data of examples shown in FIGS. 9 and 10; in addition, those of other examples in which the $Fe_2O_3$ content is set to 54 mol percent and the MnO and ZnO contents are charged. The former values are indicated by circles and the latter values by solid circles.

Figure 11:
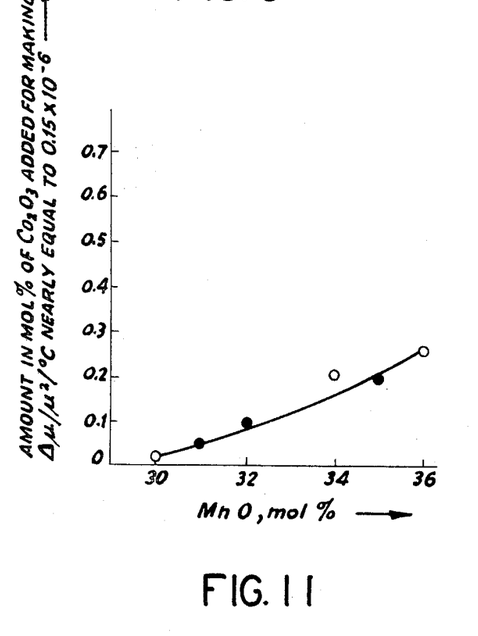

The figure gives the amount of $Co_2O_3$ required to attain an initial-permeability temperature coefficient of approximately $+0.15 \times 10^{-6}$ within a temperature range of $-30°$ C. to $+90°$ C. in relation to the amount of MnO.

As can be seen from FIG. 11, the amount of $Co_2O_3$ required to attain the desired initial-permeability temperature coefficient is least for the composition having the least MnO content (i.e. the largest ZnO content) and the amount required somewhat increases with an increase in the percentage of MnO.

It has so far been exemplified that the addition of $Co_2O_3$ can improve the initial-permeability temperature coefficient of Mn-Zn ferrite over a wide temperature range without regard to any major change in the composition ratio of $Fe_2O_3$, MnO, and ZnO in the ferrite. The fact that this advantageous effect of $Co_2O_3$ is kept unimpaired in different firing temperatures is illustrated by Example 8.

EXAMPLE 8

$Co_2O_3$ is added to a Mn-Zn ferrite of the same fundamental composition as the test specimen used in Example 3 and shown in FIG. 4, i.e., 54.6 mol percent $Fe_2O_3$, 34 mol percent MnO, and 11.4 mol percent ZnO. The mixture is fired in atmospheres containing 0.3% and 0.5% oxygen at 1180° C. for 8 hours. The resulting changes in initial permeability vs. temperature are shown, respectively, in FIGS. 12 and 13.

Figure 12:
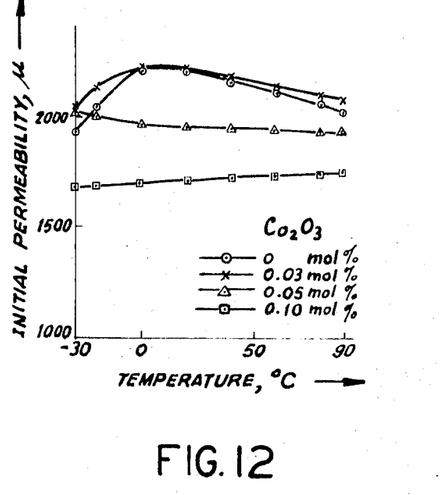

FIG. 12 shows that when $Co_2O_3$ is not added the initial permeability has a peak around 10° C., indicating a pattern as if the initial permeability temperature curve has as a whole shifted toward the low temperature side as compared with that of the composition without $Co_2O_3$ as shown in FIG. 4 of Example 3.

If $Co_2O_3$ is added to this, say in an amount of 0.10 mol percent, a Mn-Zn ferrite is obtained which has an initial-permeability temperature coefficient of $$(0.17 \pm 0.04) \times 10^{-6}$$

over a wide temperature range of $-30°$ C. to $+90°$ C. Thus, FIG. 12 indicates that even when the firing is performed in an atmosphere wherein the partial pressure of oxygen is relatively low the effect of $Co_2O_3$ to realize the initial-permeability temperature coefficient of small absolute value over a wide temperature range can be sustained.

As already described in Example 3, the effective amount of $Co_2O_3$ to be added in order to attain a small, positive initial-permeability temperature coefficient is 0.13 mol percent when the Mn-Zn ferrite of the aforesaid composition is fired in an atmosphere of $N_2$ containing 0.4% $O_2$ at 1180° C. for 8 hours. On the other hand, when the ferrite is fired in $N_2$ containing 0.3% $O_2$ at 1180° C. for 8 hours, the effective amount of $Co_2O_3$ to be added is as small as 0.10 mol percent. Considering this together with the fact that the initial permeability vs. temperature curve observed without the addition of $Co_2O_3$ is displaced as a whole toward the low temperature side upon firing in $N_2$ containing 0.3% $O_2$, it is appreciated that the results given in FIG. 12 correspond to those obtained by firing a composition containing more $Fe_2O_3$ than does the fundamental composition of the present example in $N_2$ containing 0.4% $O_2$.

Figure 13:
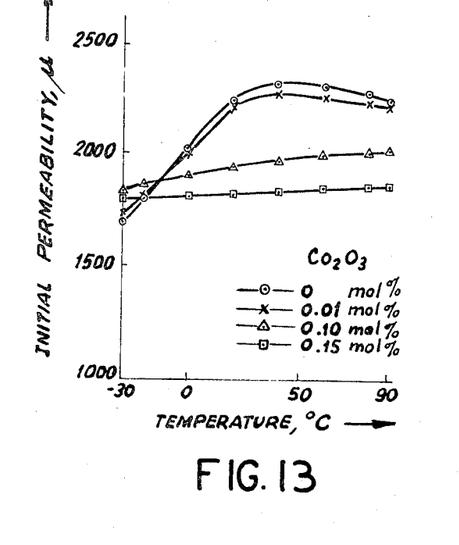

The results shown in FIG. 13 indicate a general tendency just opposite to that illustrated in FIG. 12. In the figure, the initial permeability of the ferrite free from $Co_2O_3$ has a peak at about 50° C. and exhibits a pattern such that the initial permeability vs. temperature curve has moved generally to the high temperature side.

Addition of $Co_2O_3$ of 0.15 mol percent to the Mn-Zn ferrite permits the latter to have an initial-permeability temperature coefficient of $(0.16 \pm 0.04) \times 10^{-6}$ over a wide temperature range of $-30°$ C. to $+90°$ C. Thus, FIG. 13 shows that $Co_2O_3$'s ability of attaining the temperature coefficient of a small absolute value over a wide temperature range can be maintained even when the ferrite is fired in an atmosphere having a relatively high oxygen partial pressure.

Comparing the results in FIG. 13 with those in FIG. 4 of Example 3 in which Mn-Zn ferrite of the same fundamental composition as in this example was fired in $N_2$ containing 0.4% $O_2$ at 1180° C. for 8 hours, it is obvious that the former shows results which correspond to those obtained by firing a composition containing less $Fe_2O_3$ than that in the fundamental composition of the example in $N_2$ containing 0.4% $O_2$.

It will be seen from Example 8 that the effect of $Co_2O_3$ for realizing an initial-permeability temperature coefficient of a small absolute value over a wide temperature range can be maintained irrespective on any change in the firing atmosphere and that the effective amount of $Co_2O_3$ to be added increases slightly with increased oxidizability of the firing atmosphere.

It has so far been explained that the initial-permeability temperature coefficient can be improved over a wide temperature range by the addition of a suitable percentage of $Co_2O_3$, whatever the pattern of the initial permeability temperature changes without the addition of $Co_2O_3$ or no matter how drastically the composition ratio of $Fe_2O_3$, MnO, and ZnO may be modified, or whatever the firing atmosphere employed. The favorable effect of $Co_2O_3$ upon the improvement of initial-permeability temperature coefficient of ferrite is observed not only when it is added to the ferrite composition but also when $Fe_2O_3$ of the composition is substituted by $Co_2O_3$.

The improvement of the initial-permeability temperature coefficient that is achieved by the substitution of $Fe_2O_3$ by $Co_2O_3$ will now be described in Example 9.

EXAMPLE 9

Figure 14:
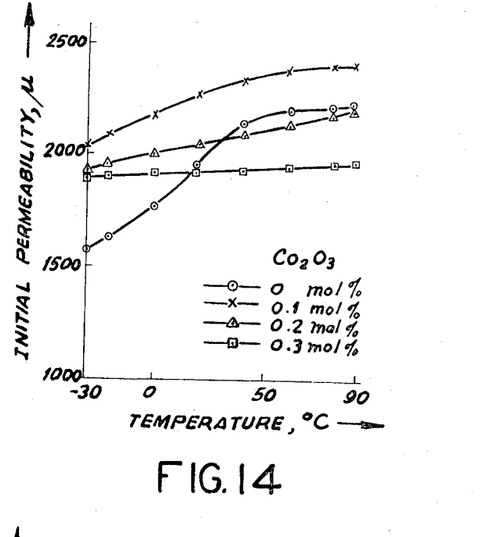

The permeability temperature changes which resulted from the substitution of $Fe_2O_3$ in a Mn-Zn ferrite having a composition of 54 mol percent of $Fe_2O_3$, 34 mol percent of MnO, and 12 mol percent of ZnO by the same molar percent of $Co_2O_3$ are shown in FIG. 14.

FIG. 14 indicates that even when $Fe_2O_3$ is substituted by the same molar percent of $Co_2O_3$, the substitution in an amount of 0.3 mol percent can bring about an initial-permeability temperature coefficient of $$(0.15 \pm 0.03) \times 10^{-6}$$

over a wide temperature range and that the temperature coefficient can be improved as well by $Co_2O_3$ introduced in this way.

It will be seen upon comparison of FIG. 14 with FIG. 2 of Example 1 that the amount of $Co_2O_3$ required to attain the same improvement as in FIG. 2 wherein the same fundamental composition is used is more when it is introduced by substitution than by addition.

In Examples 1 through 9, disclosure has been made of the effect of $Co_2O_3$, introduced by addition or substitution, to improve the initial-permeability temperature coefficients of Mn-Zn ferrites consisting of $Fe_2O_3$, MnO, and ZnO only. Actually, however, it is usually the practice to add some impurities to Mn-Zn ferrites to improve the characteristics of the ferrites for practical uses.

Therefore, the favorable effects of $Co_2O_3$ upon the initial-permeability temperature coefficients of Mn-Zn ferrites containing impurities for modifying the initial permeability vs. temperature characterstics will be described in conjunction with the examples given below.

As has been stated, there are already available some methods of shifting initial permeability vs. temperature characteristic curves. One method consists in the addition of metallic ions trivalent or higher positive valency. A Mn-Zn ferrite containing as an impurity $SnO_2$ which represents a metallic ion trivalent or higher positive valency will now be cited as an example.

$SnO_2$ is added as an impurity in different amounts of 0, 0.3, 0.7, 0.9 and 1.2 mol percent to a Mn-Zn ferrite having a fundamental composition of 53 mol percent $Fe_2O_3$, 36 mol percent MnO, and 11 mol percent Zn-O while maintaining the ratio of the three fundamental constituents constant. The resulting changes in the initial permeability vs. temperature characteristic curves are graphically shown in FIG. 15.

Figure 15:
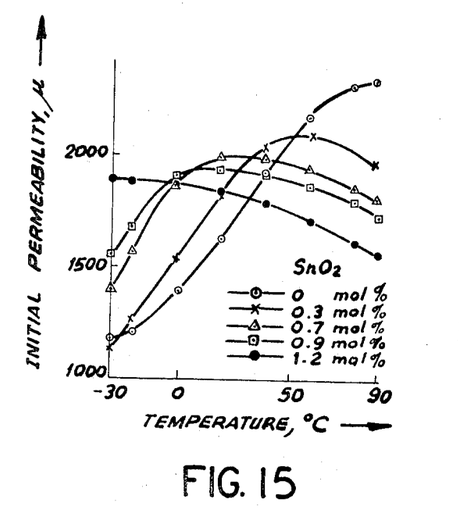

Referring to FIG. 15, it will be apparent that the ferrite specimen free from $SnO_2$ exhibits a monotonous rise with temperature of the initial permeability, which the specimen containing 0.3 mol percent $SnO_2$ has a peak in the vicinity of 55° C. and the specimen containing 1.2 mol percent shows a steady decline. These trends may well be regarded as comparable to three of the four patterns obtained with different composition ratio of $Fe_2O_3$ in the fundamental composition already described.

It can be seen from FIG. 15 that the effect of $SnO_2$ added is proven by the apparent shift of the initial permeability vs. temperature curve toward the low temperature side. The initial-permeability temperature coefficient is thus shown to have undergone a major change within the range of $-30°$ C. to $+90°$ C.

The effect attributable to the addition of $Co_2O_3$ to a Mn-Zn ferrite containing $SnO_2$ that confers such a material influence upon the initial-permeability temperature coefficient of the ferrite will now be illustrated in Example 10.

EXAMPLE 10

Test specimens of a Mn-Zn ferrite having the aforesaid composition, or a fundamental composition of 53.0 mol percent $Fe_2O_3$, 36 mol percent MnO, and 11 mol percent ZnO, are allowed to contain 0.3 and 1.2 mol percent of $SnO_2$ while the above composition ratio is kept constant, so that the pattern of the initial permeability vs. temperature characteristic curve of the ferrite is modified so that it has a peak and monotonously decreases, respectively. To such specimens are added different percentages of $Co_2O_3$ thereby changing the initial permeability vs. temperature characteristic curves as shown, respectively, in FIGS. 16 and 17.

Figure 16:
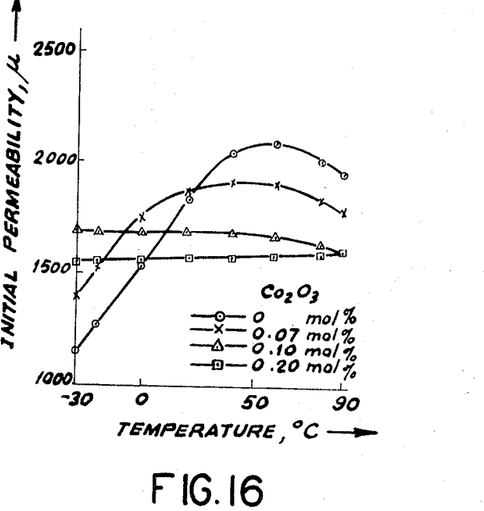

From FIG. 16, it can be seen that the ferrite containing 0.3 mol percent $SnO_2$ but no $Co_2O_3$ has a peak at a point about 55° C. but, with the addition of 0.2 mol percent $Co_2O_3$, it exhibits a small positive temperature coefficient of $(+0.18\pm0.04)\times10^{-6}$.

Figure 17:
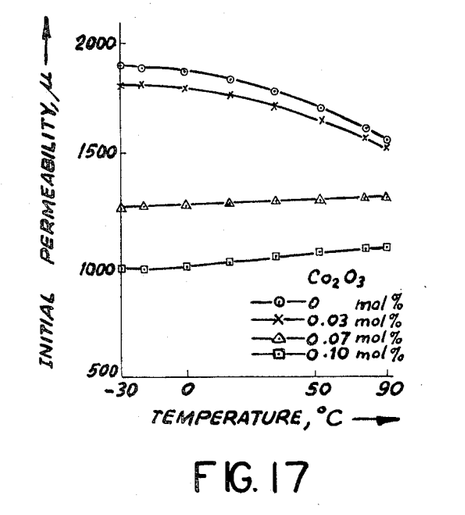

FIG. 17 shows that the ferrite containing 1.2 mol percent $SnO_2$ but no $Co_2O_3$ has a negative temperature coefficient of $-0.3\times10^{-6}$ to $-1.3\times10^{-6}$ which monotonously decreases within the temperature range of $-30°$ C. to $+90°$ C. but, with the addition of 0.07 mol percent $Co_2O_3$, it can have a small positive temperature coefficient of $(+0.15\pm0.02)\times10^{-6}$.

When $SnO_2$ is added as an impurity to a Mn-Zn ferrite, the initial permeability vs. temperature characteristic curve appears to undergo a change in the pattern slightly while shifting toward the low temperature side with a drop of the maximum value of the initial permeability as illustrated in FIG. 15. It is very difficult to realize a positive and small initial-permeability temperature coefficient over a wide range by the addition of $SnO_2$, and a small amount of cobalt added to a Mn-Zn ferrite containing $SnO_2$ is still effective in improving the initial-permeability temperature coefficient of the ferrite. These facts are illustrated in FIGS. 16 and 17.

With respect to the significance of the addition of $SnO_2$, it has been experimentally studied that the amount of $Co_2O_3$ required to attain small positive values of the temperature coefficient over a wide temperature range is decreased with an increase in the $SnO_2$ content. Our experiments have shown that, for a Mn-Zn ferrite composed of 53 mol percent $Fe_2O_3$, 36 mol percent MnO, and 11 mol percent ZnO, and free from $SnO_2$, the amount of $Co_2O_3$ required to attain a small, positive initial-permeability temperature coefficient $(+0.15\times10^{-6})$ is 0.45 mol percent, and for a ferrite of the above composition which contains 0.3 mol percent $SnO_2$ the amount is 0.2 mol percent, and for those which contain 0.7 mol percent and 0.9 mol percent $SnO_2$, the amounts are 0.15 and 0.12 mol percent $Co_2O_3$, respectively. For a Mn-Zn ferrite containing as much as 1.2 mol percent $SnO_2$, the required amount of $Co_2O_3$ is 0.07 mol percent. This tendency coincides with that observed when the composition percentage of $Fe_2O_3$ is increased.

Next, the effect of adding cobalt to the Mn-Zn ferrite which contains as an impurity lithium which is typical of additives for shifting the initial permeability vs. temperature characteristics curve in the direction opposite to that attained by $SnO_2$, that is, typical of metallic ions of bivalent or less positive valency, will be described.

Figure 18:
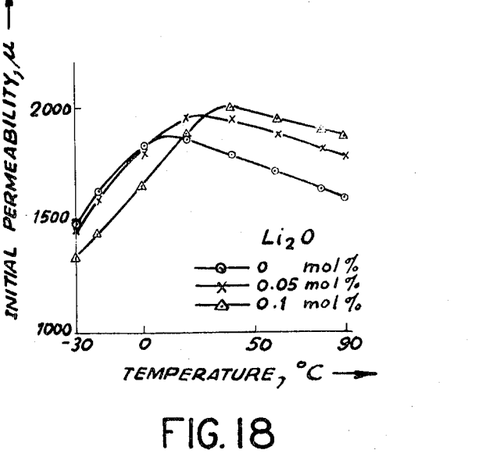

In Fig. 18 there are shown initial permeability vs. temperature characteristic curves of Mn-Zn ferrite specimens having a fundamental composition of 55 mol percent $Fe_2O_3$, 36 mol percent MnO, and 9 mol percent ZnO, containing none, 0.05 mol percent and 0.1 mol percent $Li_2O$. It will be seen that with the increase of the $Li_2O$ content the curves shift toward the high temperature side with growing maximum values of initial permeability while maintaining almost unmodified patterns as a whole.

These initial permeability vs. temperature characteristic curves invariably possess the maximum values within the temperature ranges which we used in the measurement. The shifting of the curves due to the $Li_2O$ contents is exactly opposite to that attributable to the $SnO_2$ contents.

EXAMPLE 11

Figure 19:
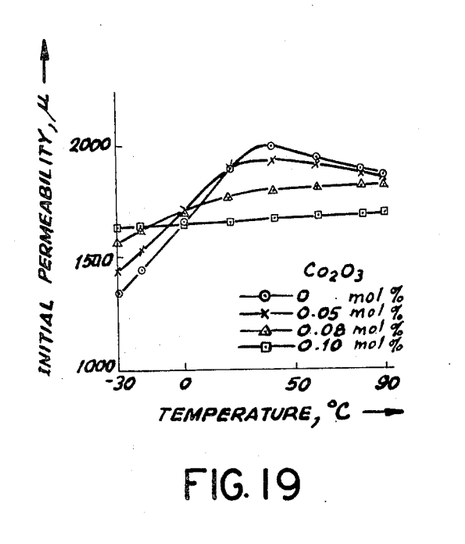

Changes of the initial permeability vs. temperature characteristic curve of a Mn-Zn ferrite having a fundamental composition of 55 mol percent $Fe_2O_3$, 36 mol percent MnO, and 9 mol percent ZnO and containing 0.1 mol percent $Li_2O$ added as an impurity while the ratio of the above composition is kept unchanged, with the addition of different amounts of $Co_2O_3$, are shown in FIG. 19.

As can be seen from the figure, the ferrite which exhibits an initial permeability vs. temperature curve having a maximum value in the vicinity of 35° C. when it is free from $Co_2O_3$ shows an initial-permeability temperature coefficient of $(+0.15\pm0.02)\times10^{-6}$ upon the addition of 0.1 mol percent $Co_2O_3$.

This example clarifies the beneficial effect of a small amount of cobalt upon the temperature coefficient of a Mn-Zn ferrite containing $Li_2O$ as an impurity for shifting the initial permeability vs. temperature characteristic curve toward the high temperature side.

The significance of the addition of $Li_2O$ lies in that it invites a tendency as if the percentage of $Fe_2O_3$ is thereby decreased. Experiments have shown that the amount of $Co_2O_3$ to be added in order to attain a small, positive temperature coefficient over a wide temperature range is increased with the increase of the $Li_2O$ content. It has now been illustrated by eleven examples that a small amount of cobalt is very effective for realizing a small, positive initial-permeability temperature coefficient for Mn-Zn ferrites over a wide temperature range as envisaged by the present invention. From these examples, it will be seen that the amount of $Co_2O_3$ required to realize a small, positive temperature coefficient varies with the fundamental composition of the ferrite, the atmosphere used, and the type of additive which shifts the initial permeability vs. temperature characteristic curve of the ferrite.

As regards the fundamental composition, the tendency observed is such that, as shown in FIG. 8, an increase in the $Fe_2O_3$ content of a Mn-Zn ferrite necessitates a lesser amount of $Co_2O_3$ for realizing a small, positive temperature coefficient over a wide temperature range, while, as shown in FIG. 11, an increase in the MnO content of the Mn-Zn ferrite makes it necessary to use an increased amount of $Co_2O_3$.

That the amount of $Co_2O_3$ required is increased by the replacement of $Fe_2O_3$ by $Co_2O_3$ is illustrated in Example 9 and FIG. 14. Regarding the firing atmosphere, the higher the oxygen partial pressure in the atmosphere the greater the optimum amount of $Co_2O_3$ required to attain a small, positive temperature coefficient over a wide temperature range (as if the $Fe_2O_3$ content of the Mn-Zn ferrite has been decreased) as shown in FIGS. 4, 12 and 13.

Also, as described in Examples 10 and 11, it is obvious that the optimum amount of $Co_2O_3$ required for ferrites of the same fundamental composition varies with the content of a trivalent or higher valency ion such as $Sn^{4+}$ or the content of a bivalent or lower valency ion such as $Li^+$ which has an effect of shifting the initial-permeability temperature coefficient. To illustrate it in more detail, it is seen for Example 10 that an increased content of high valency metallic ion, e.g. of $SnO_2$ produces an effect similar to an increase in the composition of $Fe_2O_3$, that is, a decrease in the optimum amount of $Co_2O_3$ required. Conversely, Example 11 shows that the introduction of a low valency metallic ion, e.g. of $Li_2O$, gives an effect as if the percentage of $Fe_2O_3$ in a Mn-Zn ferrite has been reduced, that is, an increase in the optimum amount of $Co_2O_3$ required.

It is therefore possible to regard the effects of additives which tend to modify the atmosphere and initial permeability vs. temperature curve in terms of the variation of the percentage of $Fe_2O_3$ in the fundamental composition and thus the consideration of the effective amount of $Co_2O_3$ to be added may well be limited to the basic ferrite composition alone.

Consider the lower limit for the amount of $Co_2O_3$ which may be effectively added to attain a small, positive temperature coefficient over a wide temperature range. From the tendency of changes in the amount of $Co_2O_3$ required to attain a small, positive, and constant initial-permeability temperature coefficient of $$(+0.15\pm0.03)\times10^{-6}$$

over a wide temperature range in the cases where the composition ratios of $Fe_2O_3$ and MnO are changed, as exemplified respectively in FIGS. 8 and 11, it is appreciated that the factor which determines the lower limit is defined as a ferrite composition having a large percentage of $Fe_2O_3$ and a small percentage of MnO.

The fundamental composition described and illustrated in Example 7 and FIG. 9 and which consists of 54 mol percent $Fe_2O_3$, 30 mol percent MnO, and 16 mol percent ZnO plus 0.01 mol percent $Co_2O_3$ exhibits a bend at the region below $-30°$ C. In the temperature range of $-30°$ C. to $+90°$ C. which we specify, it displays an initial-permeability temperature coefficient as small as about $(+0.38\pm0.08)\times10^{-6}$. If in the ferrite having 30 mol percent MnO the percentage of $Fe_2O_3$ alone is increased to more than 54.0 mol percent, the linearity of the initial permeability vs. temperature characteristics in the range of $-30°$ C. to $+90°$ C. will be adversely affected and will give a minimum value. If the amount of $Co_2O_3$ to be added to this composition is decreased to less than 0.01 mol percent, a bend will appear in the range between $-30°$ C. and $+90°$ C. and the gradient will be sharpened. For these reasons, the minimum amount of $Co_2O_3$ required to realize a small, positive temperature coefficient which is approximately constant at temperatures between $-30°$ C. and $+90°$ C. is specified to be 0.01 mol percent.

Considering the upper limit next, it is apparent from FIGS. 8 and 11 that the effective amount of $Co_2O_3$ to be added is increased in a Mn-Zn ferrite in which the percentage of $Fe_2O_3$ is small and that of MnO is large. It will be readily inferred from Example 8 and FIG. 12 that if the $Fe_2O_3$ content of the above fundamental composition is replaced with $Co_2O_3$ the amount of $Co_2O_3$ required to realize a small, positive initial-permeability temperature coefficient over a wide temperature range will be increased.

However, as will be understood from comparison of FIG. 8 with FIG. 11, the effective amount of $Co_2O_3$ to be added is possibly governed to a large extent by the percentage of $Fe_2O_3$ contained in the fundamental composition because the change of the MnO content from 30 to 36 mol percent, or by 6 mol percent, brings only a minor change in the optimum addition amount of cobalt from 0.02 to 0.25 mol percent, whereas the change of the $Fe_2O_3$ content from 52 to 56 mol percent, or by 4 mol percent causes a sharp increase in the optimum addition amount of cobalt from 0.05 to 0.6 mol percent. Presumably, the less the $Fe_2O_3$ content the larger the amount of $Co_2O_3$ required to be added, but from the standpoint of actual use, extreme reduction in the composition percentage of $Fe_2O_3$ is meaningless since it decreases the absolute value of initial permeability and intensifies various losses, e.g., residual loss and hysteresis loss, and moreover because the same tendencies can result from the too generous addition of $Co_2O_3$.

Figure 20:
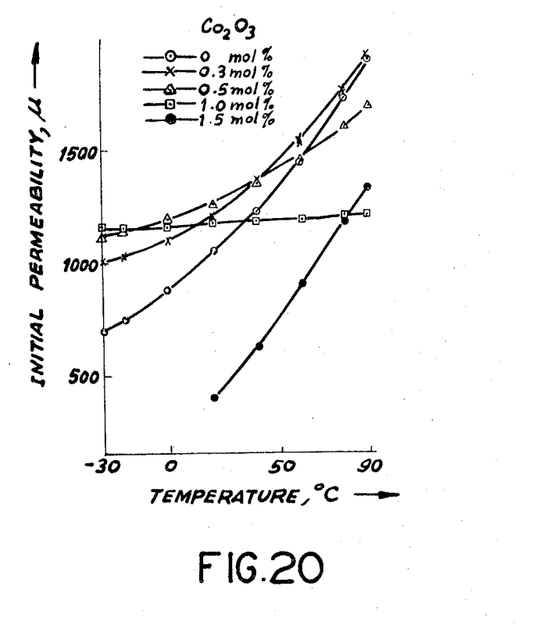

From the viewpoint of material for practical use, therefore, we limit the amount of $Co_2O_3$ to be added to 1 mol percent with the characteristic of $\mu$, 1160, $$\Delta\mu/\mu^2/\Delta C = (+0.30\pm0.10)\times10^{-6}$$

as attained by a Mn-Zn ferrite having a fundamental composition of 49 mol percent $Fe_2O_3$, 30 mol percent MnO, 20 mol percent ZnO, and 1 mol percent $Co_2O_3$, or a specimen obtained from a Mn-Zn ferrite having a composition of 50 mol percent $Fe_2O_3$, 30 mol percent MnO, and 20 mol percent ZnO by substituting 1 mol percent $Fe_2O_3$ with the same amount of $Co_2O_3$, among different percentage of substitution as shown in FIG. 20. It should be added that generally ferrites containing $Co_2O_3$ in excess of the limited amount, for example 1.5 mol percent of $Co_2O_3$, substituting the corresponding percentage of $Fe_2O_3$ as shown in FIG. 20, would again exhibit positive large initial-permeability temperature coefficients.

It has so far been described that in order to obtain a small, constant initial-permeability temperature coefficient for a Mn-Zn ferrite over a wide temperature range the addition of $Co_2O_3$ in the range of 0.01 to 1 mol percent is most effective.

Next, the combined effect of three additives will be explained by an example in which both CaO and $SiO_2$ which are known as helpful in improving the loss characteristics of ferrites are added in different percentages to a Mn-Zn ferrite composition which already contains $Co_2O_3$ so as to have a desired initial-permeability temperature coefficient. Combined effect of CaO and $SiO_2$ upon Mn-Zn ferrites of a great variety of compositions has been confirmed by U.S. Pat. No. 3,106,534. In Example 12 given below, it is shown that the effect of $Co_2O_3$ added in order to improve the initial permeability vs. temperature characteristics is not affected by the presence of CaO and $SiO_2$ but the improvement of loss characteristics due to the presence of the latter two additive ingredients is realized as well.

EXAMPLE 12

To a Mn-Zn ferrite having the same fundamental composition as in Example 1, i.e. 54 mol percent $Fe_2O_3$, 34 mol percent MnO, and 12 mol percent ZnO there is added 0.2 mol percent $Co_2O_3$ which is needed to attain an initial-permeability temperature coefficient which is positive, small and constant in absolute value over the temperature range of $-30°$ C. to $+90°$ C. Furthermore, different percentages of CaO and $SiO_2$ are added at the same time to obtain low loss characteristics. The resulting loss characteristics tan $\delta/\mu\times10^{-6}$ and initial-permeability temperature coefficient at $-30°$ C. to $+90°$ C., $\Delta\mu/\mu^2/\Delta C\times10^{-6}$, are given, respectively in FIGS. 21 and 22.

Figure 21:
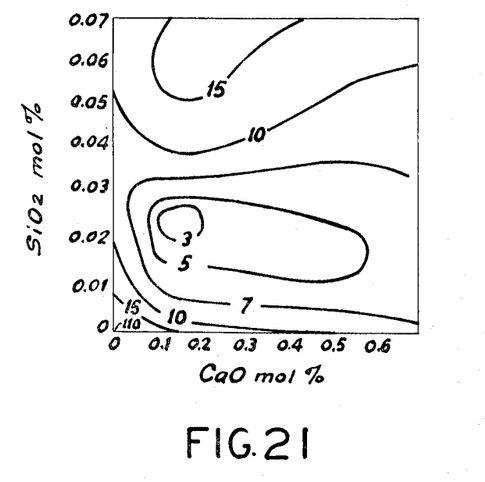
FIGS. 21 and 22 are graphs for explaining the additive composition of the ferrites of this invention.

From FIG. 21 it can be seen that the loss characteristic of $110\times10^{-6}$ without the addition of CaO and $SiO_2$ is improved to $5\times10^{-6}$ or less with the addition to the ranges of 0.1 mol percent$\leq$CaO$\leq$0.6 mol percent, 0.01 mol percent $\leq$SiO_2$\leq$0.03 mol percent, and is further improved to $3\times10^{-6}$ or less with the ranges of 0.1 mol percent $\leq$CaO$\leq$0.2 mol percent, 0.02 mol percent$\leq$SiO$_2$$\leq$0.03 mol percent.

Figure 22:
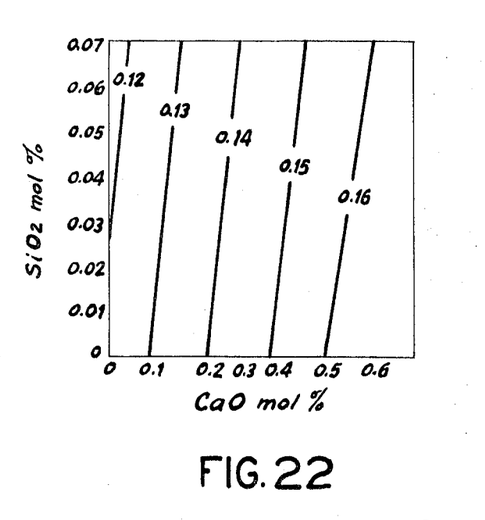

FIG. 22 illustrates that the initial-permeability temperature coefficients of the resulting ferrites range from $(0.12\pm0.03)\times10^{-6}$ to $(0.16\pm0.03)\times10^{-6}$ over a temperature region of $-30°$ C. to $+90°$ C. throughout the experiments conducted on the addition of SiO$_2$ and CaO. In particular, the point A in either FIG. 21 or 22 corresponds to the coexistence of the three additives of 0.2 mol percent Co$_2$O$_3$, 0.12 mol percent CaO, and 0.025 mol percent SiO$_2$, where the loss characteristic is $2.2\times10^{-6}$ and initial-permeability temperature coefficient is $(0.13\pm0.03)\times10^{-6}$. This clearly indicates that the presence of both CaO and SiO$_2$ not only contributes largely to the improvement of loss characteristics but has no adverse effect upon the effect of Co$_2$O$_3$ for the improvement of the initial-permeability temperature coefficients.

Accordingly, when CaO and SiO$_2$ are both present, the effective amount of Co$_2$O$_3$ for Mn-Zn ferrites again ranges from 0.01 to 1 mol percent. On the other hand, the effective amounts of CaO and SiO$_2$ are in the ranges of 0.1 to 0.6 mol percent and 0.01 to 0.07 mol percent, respectively.

From the 12 preceding examples of the present invention, it should be apparent that the presence of suitable amounts of Co$_2$O$_3$, CaO, and SiO$_2$ not only improves the loss characteristics of Mn-Zn ferrites but, in addition, controls the initial-permeability temperature coefficients to constant values best suited for intended uses over wide temperature ranges. Thus, according to the present invention, magnetic materials which possess low loss characteristics and at the same time, high stability against temperature changes over wide temperature regions can be obtained.

While the principles of the invention have been described in connection with specific apparatus, it is to be clearly understood that this description is made only by way of example and not as a limitation to the scope of the invention as set forth in the objects thereof and in the accompanying claim.

What is claimed is:

1. A maganese-zinc ferrite composition consisting essentially of 52 mol percent to 56 mol percent Fe$_2$O$_3$, mol percent to 36 mol percent MnO, 0.01 mol percent to 1 mol percent Co$_2$O$_3$, 0.1 mol percent to 0.6 mol percent CaO, 0.01 mol percent to 0.07 mol percent SiO$_2$, and the balance essentially ZnO, said composition being characterized by small initial-permeability temperature coefficients over a wide temperature range.

References Cited

UNITED STATES PATENTS 2,929,787   3/1960   Eckert ____________ 252—62.62
3,106,534   10/1963  Akashi et al. ______ 252—62.62

TOBIAS E. LEVOW, Primary Examiner

R. D. EDMONDS, Assistant Examiner

U.S. Cl. X.R.

252—62.62, 62.63

UNITED STATES PATENT OFFICE
CERTIFICATE OF CORRECTION

Patent No. 3,574,116            Dated April 6, 1971

Inventor(s) Izuru Sugano et al.

It is certified that error appears in the above-identified patent and that said Letters Patent are hereby corrected as shown below:

Column 14, line 14, before "mol", first occurrence insert -- 30 --.

Signed and sealed this 17th day of August 1971.

(SEAL)
Attest:

EDWARD M. FLETCHER, JR.                     WILLIAM E. SCHUYLER,
Attesting Officer                             Commissioner of Patents